United States Patent

Bastian et al.

[15] 3,705,299

[45] Dec. 5, 1972

[54] CIRCUIT ARRANGEMENT FOR CONVERTING A DECIMAL NUMBER CODED IN THE BCD CODE INTO A PURE BINARY NUMBER

[72] Inventors: Ingbert Bastian, Munich; Horst Brogl, Unterhaching, both of Germany

[73] Assignee: Messerschmitt-Bolkow-Blohm, Munich, Germany

[22] Filed: Sept. 24, 1971

[21] Appl. No.: 183,602

Related U.S. Application Data

[63] Continuation of Ser. No. 854,831, Sept. 3, 1969, abandoned.

[52] U.S. Cl. ............................235/155, 340/347 DD

[51] Int. Cl. ................................................G06f 5/00

[58] Field of Search .............235/154, 155, 169, 174; 340/347 DD

[56] References Cited

UNITED STATES PATENTS

| | | | |
|---|---|---|---|
| 3,064,894 | 11/1962 | Campbell | 235/155 |
| 3,099,742 | 7/1963 | Byrne | 235/155 |
| 3,449,555 | 6/1969 | An Wang | 235/155 |
| 3,524,976 | 8/1970 | Mao Wang | 235/155 |

OTHER PUBLICATIONS

Camp: " A Converter For Binary Coded Decimal To Binary Numbers" , IBM Tech. Discl. Bullin. Vol. 2, No. 6, apnl 1960, page 46

*Primary Examiner*—Thomas A. Robinson
*Attorney*—John J. McGlew et al.

[57] ABSTRACT

A circuit arrangement, for converting a decimal number expressed in the BCD code into a pure binary number, comprises plural binary full adder circuits arranged successively in ascending binary digit order and each having signal inputs and binary digit outputs. Plural BCD code input terminals have applied thereto the decimal number to be converted, and lines connect each code input terminal commonly to all those signal inputs of the adder circuits which are associated, in correct decimal column position, with those $2^n$ numbers which yield, as their sum, the decimal number, expressed in the BCD code, and indicated, with consideration of its decimal column position, at their respective code input terminals. The adder circuits are interconnected in such a manner that the carryover and output signals of each binary full adder circuit are supplied in correct decimal column position to the signal inputs of the respective succeeding binary full adder circuit.

5 Claims, 1 Drawing Figure

PATENTED DEC 5 1972 3,705,299
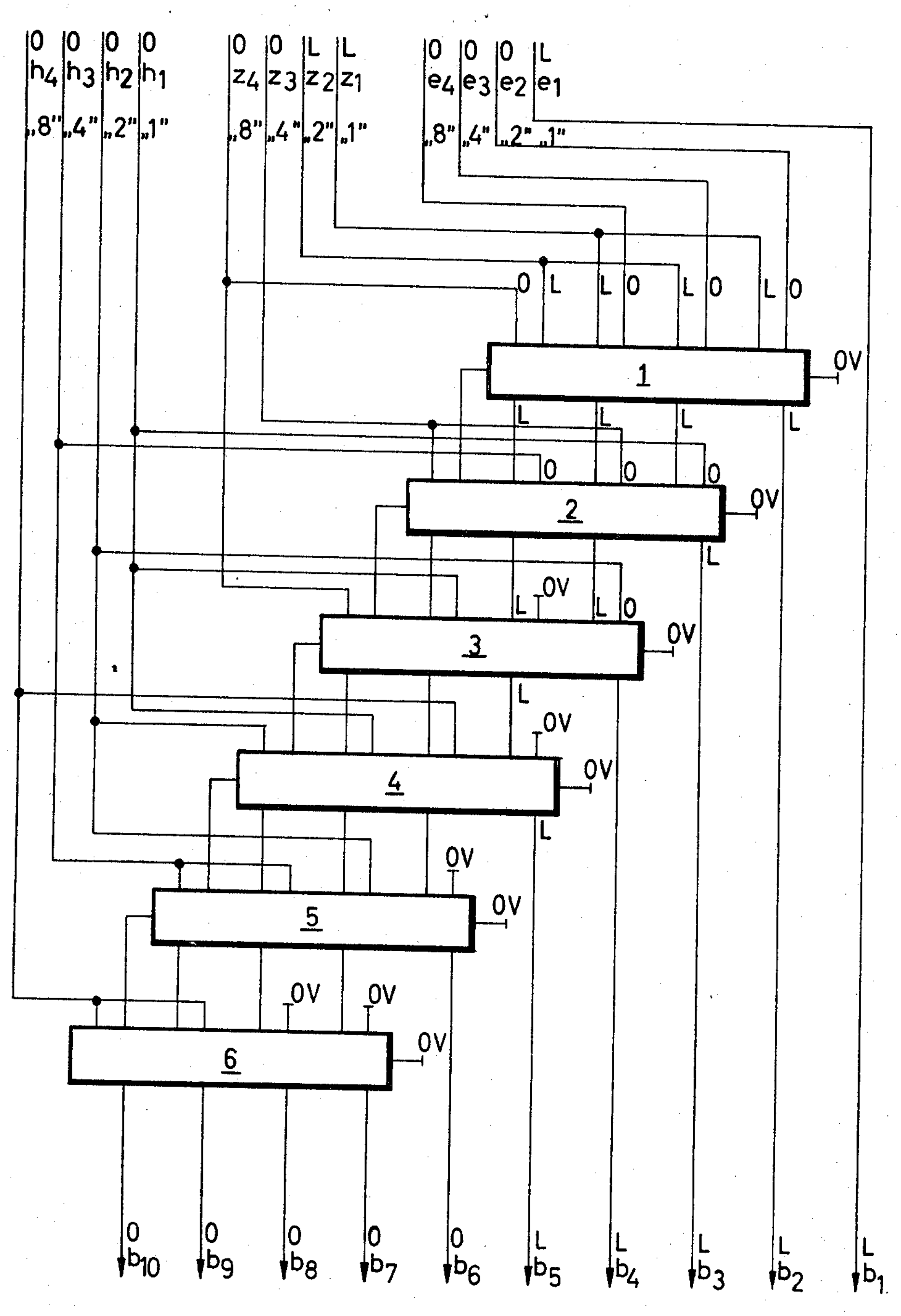
INVENTORS
Ingbert Bastian
Horst Brogl
By McGlew and Toren
ATTORNEYS

CIRCUIT ARRANGEMENT FOR CONVERTING A DECIMAL NUMBER CODED IN THE BCD CODE INTO A PURE BINARY NUMBER

This is continuation of Application Ser. No. 854,831, filed Sept. 3, 1969 and now abandoned.

BACKGROUND OF THE INVENTION

Presently known circuit arrangements for converting a decimal number, expressed in the BCD code, also known as the 1–2–4–8 code, into a binary number, work with counter circuits. In these arrangements, a binary counter is continued in the counting mode, for example, with timing pulses derived from a timing generator, up to a certain counter level which is then available at the outputs of the counter in the form of a pure binary number. These known circuit arrangements have the disadvantage that they require a relatively long conversion time until they attain the respective desired counter level, due to the timing generator and its finite timing frequency. The switching expense, due to such a counter, an associated counting circuit, and the timing generator, is quite considerable.

SUMMARY OF THE INVENTION

This invention relates to the conversion of decimal numbers into binary numbers and, more particularly, to an improved, simplified and inexpensive circuit arrangement for converting a decimal number, expressed in the BCD code, into a pure binary number.

The objective of the invention is to provide such a circuit arrangement which differs advantageously from presently known arrangements for such conversion, with respect to their switching expense and their operating speed.

In accordance with the invention, several circuits, working as binary full adders, are so connected with the input lines that each input line is connected commonly to all the inputs of the circuits which are associated, in correct decimal column position, with those $2^n$ numbers which indicate, as the sum, the decimal number indicated by their respective input line within the BCD code, with consideration of its decimal column position. The individual binary full adder circuits are so connected with each other that their carry-over and output signals are applied, in correct decimal column position, to the inputs of the respective following binary full adder circuit.

By virtue of this relatively simple circuit arrangement, the desired conversion of the BCD code is educed to a binary addition problem, making use of the finding that each decimal number indicated in the BCD code by a certain bit is composed of the sum of several summands provided exclusively as powers of the number 2. Due to the addition, in correct decimal column position, of all decimal numbers determined by thus decomposing the BCD code into individual bits, to each of which is assigned an input line, the corresponding binary number is obtained by adding all bits belonging to a binary digit of the binary number.

In accordance with the preferred embodiment of the invention, the binary full adder circuits are designed for four binary digits. In this case, each binary full adder circuit has four pairs of inputs each associated with a respective output. The summands are fed to the inputs, and the sum of the individual binary digits is derived from the outputs. Each binary full adder circuit has an additional output for transferring the carry-over signal, indicating the value of the respective next higher binary digit, to the next higher binary full adder circuit which immediately succeeds the respective binary full adder circuit.

Such binary full adder circuits are, per se, available on the market as inexpensive integrated circuits, and are connected, in a simple manner, in accordance with the invention, with the input lines carrying the decimal number to be converted, and expressed in BCD code, and also with each other.

The circuit arrangement of the invention is strictly static, without any timing generator, so that there are no sychronization problems. The working speed of the entire circuit arrangement is thus determined solely by the switching times of the individual elements, and these are particularly short in the integrated circuits used in accordance with the preferred embodiment of the invention.

An object of the invention is to provide an improved circuit arrangement for converting a decimal number, expressed in the BCD code, into a pure binary number.

Another object of the invention is to provide such a circuit arrangement which differs advantageously from presently known arrangements, with respect to cost and operation speed.

A further object of the invention is to provide such a circuit arrangement in which the desired conversion of the code reduced to a binary addition problem.

Another object of the invention is to provide such a circuit arrangement in which the decimal numbers are determined by decomposing the BCD code into individual bits each assigned to a respective input line, with the corresponding binary number being obtained by adding all bits belonging to a binary digit of the binary number.

A further object of the invention is to provide such a circuit arrangement utilizing inexpensive integrated circuits which are commercially available and which are interconnected in a simple manner.

Another object of the invention is to provide such a circuit arrangement which is strictly static and has no synchronization problems.

For an understanding of the principles of the invention, reference is made to the following description of a typical embodiment thereof as illustrated in the accompanying drawing.

BRIEF DESCRIPTION OF THE DRAWING

In the drawing, the single figure is a schematic block diagram of the circuit arrangement embodying the invention.

DESCRIPTION OF THE PREFERRED EMBODIMENT

The embodiment of the invention illustrated in the drawing has twelve input terminals or lines to which are applied a decimal number expressed in the BCD code. These input terminals or line include four first inputs $e_1$–$e_4$ for the units expressed in the BCD code, four additional inputs $z_1$–$z_4$ for the tens expressed in the BCD code, and four input terminals or lines $h_1$–$h_4$ for the hundreds of a decimal number, to be converted, expressed in the BCD code.

A first circuit 1, working as a binary full adder, is so connected with these input lines that, one the one hand, the input lines $e_2$, of the first group of input lines and associated with the number $2^1$, is applied to one of its two summand inputs related to the lowest digits. The input lines $z_1$ of the tens input terminals or lines of the decimal number expressed in the BCD code, and associated with the number $2^0$, is connected with the other summand input of this input pair.

This last-mentioned input line or terminal $z_1$ carries, as the lowest decimal place, the number 0 or 10, the number 10 being decomposable into the summands 2 and 8. Consequently, input line or terminal $z_1$ is also connected, additionally, to the third lowest binary input of binary full adder circuit 1, and which is associated with the number $2^3$. The input line or terminal $e_3$ of the unit lines or terminals, and associated with the number $2^2$, is connected with one summand input of the pair relating to the second lowest binary input of the binary full adder 1. The other summand input of this pair is connected with the input terminal or line $z_2$ of the tens lines or terminals, associated with the number $2^1$, since input line $z_2$ indicates a number 20 which can be decomposed or broken down into summands of 4 and 16. This same input line $z_2$ of the tens input terminals or lines is consequently connected, additionally, to one of the summand inputs of the binary full adder 1 corresponding to its highest binary digit, namely, the number $2^4$.

In accordance with the same pattern, input line $e_4$, of the unit input lines or terminals and associated with the number $2^3$, is connected to the still free summand input terminal of that pair corresponding to the third highest binary digit of the binary full adder 1. The input line $z_4$ of the tens lines or terminals, associated with the number $2^3$, is connected, however, to the still free input of the highest binary digit of the binary full adder 1, since input line $z_4$ indicates the number 80 which can be broken down or decomposed into the summands 16 and 64.

The output of binary full adder 1, associated with the lowest binary digit, is led out directly as output $b_2$ of the circuit arrangement, and carries the second lowest digit, namely $2^1$, which is the binary number available at this output. The output $b_1$, associated with the lowest digit of this binary number, is connected directly with the input line or terminals $e_1$ of the unit input lines or terminals and which is associated with the number $2^0$. The output associated with the second lowest binary digit of binary full adder 1 is connected with that one of the inputs of a second binary full adder 2 associated with the lowest binary digit thereof.

Accordingly, the outputs corresponding to the third lowest and to the highest binary digit, of the binary full adder 1, are connected with one of the inputs of the binary full adder 2 associated with the second lowest binary digit and the third lowest binary digit, respectively. The output carrying the carry-over signal of binary full adder 1, which thus corresponds to the number $2^5$, is connected with that input of binary full adder 2 corresponding to the same number and associated with the highest binary digit. The corresponding input lines of the tens terminals and hundreds terminals are connected to the respective free inputs of binary full adder 2 in a manner similar to that described above for the input lines or terminals connected to binary full adder 1. Thus, for example, input line $h_1$ of the hundreds lines or terminals, associated with the number $2^0$, indicates either the number 0 or 100. This input line $h_1$ is connected to that input of binary full adder 2 associated with the lowest binary digit and to which the number $2^2$ is thus assigned. The number 100 corresponding to input line $h_1$ is decomposed or broken down into the summands 4, 32 and 64. Input line $h_1$ therefore is also connected to those summand inputs of the binary full adders which are associated with the outputs corresponding to the numbers $2^2$, $2^5$ and $2^6$.

Additional binary full adders 3, 4, 5 and 6 are connected in series with binary full adders 1 and 2 and connected with the input lines and terminals and with each other in a manner similar to the connections of binary full adders 1 and 2. Thereby, all decimal numbers supplied through the 12 input lines or terminals in the BCD code can be converted into a pure binary number with a corresponding number of digits. The output associated with the lowest binary digit of each binary full adder is supplied directly, as an output of the circuit arrangement, with the four highest binary digits of the binary number, available at the outputs $b_7$, $b_8$, $b_9$ and $b_{10}$, being connected directly with the outputs of binary full adder 6, which has the highest value. Summand inputs of individual binary digits which remain free in binary full adders 3, 4, 5 and 6 are connected directly with the potential representing a binary zero, so that the output signal appearing at their outputs is determined merely by the respective other input line of the pair and the carry-over, respectively.

In the embodiment described herein, with the binary full adders obtainable as integrated circuits, the signal indicating a binary "0" is applied by a voltage level of 0 Volt, and the signal indicating a binary "1" is responsive to a voltage level of 5 volts.

The method of operation of the circuit arrangement in accordance with the invention results directly from the above described linkage and the binary addition rules. In accordance with the binary addition rules, the addition of two binary "1" signals in the respective binary digit indicates a binary "0" signal and, in the next higher binary digit, a binary "1" signal as a carry-over.

By way of example, if a decimal number "31" , coded in the BCD code, is supplied in the manner indicated above to the input lines or terminals, the unit "1" is supplied directly, through input line $e_1$ of the unit lines, associated with the number $2^0$, to the output line or terminal $b_1$, corresponding to the lowest binary digit of the binary number. The "0" signal appearing at the input line or terminal $e_2$, of the unit lines, associated with the number $2^1$, is supplied to the first input of the pair of inputs of binary full adder 1 associated with the lowest binary digit. The binary "0" signal at the input line or terminal $e_3$, of the unit lines, associated with the number $2^2$, is supplied to the first input of the pair of inputs associated with the second lowest binary digit of binary full adder 1. The binary "0" signal appearing at the input line or terminal $e_4$, of the unit lines, associated with the number $2^3$, is supplied to the first input of the pair of inputs of binary full adder 1 associated with the third-lowest binary digit.

The other input of this pair has supplied thereto the binary "1" signal appearing at the input line or terminal $z_1$, of the tens lines, associated with the number $2^0$ This "1" signal, appearing in the last-mentioned input line $z_1$, is additionally supplied to the second input of the pair of inputs of binary full adder 1 associated with the lowest binary digit. The binary "1" signal appearing at the input line or terminal $z_2$, of the tens lines, associated with the number $2^1$, is applied to the input of binary full adder 1 associated with the highest binary digit and also to the second input of the pair of inputs of binary full adder 1 associated with the second lowest binary digit. The second input of the pair of inputs associated with the highest binary digit of binary full adder 1 has applied thereto the "0" signal appearing in the input line or terminal $z_4$, of the tens lines, associated with the number $2^3$. The other input lines $h_1$, $h_2$, $h_3$ and $h_4$ also carry a binary "0" signal.

The binary signals appearing in the various inputs of binary full adder 1 are added, by binary addition, so that a binary "1" signal appears in the output corresponding to the lowest binary digit of binary full adder 1. A binary "1" signal appears also at those outputs of binary full adder 1 associated with the two next higher binary digits.

The binary "1" signals appearing at the outputs associated with the three highest binary digits of binary full adder 1 are applied at one input each of the pairs of inputs of binary full adder 2 associated with the three lowest binary digits. In binary full adder 2, also, a binary addition of the individual inputs signal occurs. However, this does not lead to any changes in the binary signals appearing at the corresponding outlets, as compared to the input signals, since all the other inputs of binary full adder 2, and also those of binary full adder 3, have applied thereto a binary "0" signal.

As will be clear from an inspection of the drawing, outputs $b_1$, $b_2$, $b_3$, $b_4$ and $b_5$ of the circuit arrangement, associated with the five lowest binary digits, all receive a binary "1" signal. Thus the putre binary number represented at the output, in this manner, is composed of the sum of the natural numbers 1, 2, 4, 8 and 16, and this sum is equal to the decimal number "31" applied to the BCD code at the BCD code inputs.

The conversion process, indicated by way of example for the number "31", occurs in a similar manner with any other decimal number coded in the BCD code. The circuit arrangement illustrated in the drawing, soley by way of example, is not limited to the illustrated number of input lines, binary full adder circuits and output lines represented in the drawing, since it can be expanded, in a similar manner, to any size.

While a specific embodiment of the invention has been shown and described in detail to illustrate the application of the principles of the invention, it will be understood that the invention may be embodied otherwise without departing from such principles.

What is claimed is:

1. In a circuit arrangement for converting a decimal number, present at input lines in the BCD code, into a pure binary number indicated at output lines, and including plural full adder circuits so connected with the input lines, except that input line carrying the lowest binary digit and which is connected directly with the output line indicating the lowest binary digit, that each input line is connected commonly to all those inputs of the full adder circuits which are associated, as to correct position, with those numbers ($2^n$) whose sum is equal to the decimal number present in the respective input lines in the BCD code and taking into account the position of the respective input line, and with the respective adder circuits being connected to each other, and to the output lines indicating the pure binary number, in a manner such that the carry signals are fed, in correct position, to the inputs of the respective following adder circuit and the output signals of each adder circuit are fed, in correct position, to the output lines: the improvement comprising, in combination, said adder circuits consisting solely of identical multi-digit binary full adders, arranged successively in ascending binary digit order, and having signal inputs and binary digit outputs; means connecting that output, of each binary full adder, associated with its respective lowest binary digit, directly with that output line indicating the corresponding pure binary digit; means connecting those outputs, of each binary full adder except the last, associated with its respective higher value binary digits, with the respective corresponding value inputs of the next succeeding binary full adder; means connecting the outputs of the last binary full adder directly with the output lines indicating the respective highest pure binary digits; means connecting said input lines directly with the respective free inputs of said binary full adders; and means, including a source of potential, applying, to those inputs of said binary full adders which are not connected either to an input line or to an output of a preceding binary full adder, a potential representing a binary zero.

2. A circuit arrangement, for converting a decimal number, expressed in the BCD code, into a pure binary number, as claimed in claim 1, in which all of said binary full adder circuits have the same number of pairs of signal inputs with each pair of signal inputs being associated with a respective binary digit output.

3. A circuit arrangement, for converting a decimal number, expressed in the BCD code, into a pure binary number, as claimed in claim 1, in which each binary full adder circuit except the last has a carryover signal output connected to that input, of the respective succeeding binary full adder circuit, associated with the highest binary digit of the latter.

4. A circuit arrangement, for converting a decimal number, expressed in the BCD code, into a pure binary number, as claimed in claim 1, in which each binary full adder circuit is associated with four binary digits and has a pair of signal inputs for each binary digit and to which are fed the summands, and a respective binary digit output for each pair of signal inputs and from which the sum of the individual binary digits can be taken.

5. A circuit arrangement, for converting a decimal number, coded in the BCD code, into a pure binary number, as claimed in claim 4, in which each binary full adder circuit except the last has an additional binary digit output operable to transfer the carryover signal, indicating the value of the respective next higher binary digit, to the respective succeeding binary full adder circuit.

* * * * *